United States Patent [11] 3,607,958

| [72] | Inventors | Robert Leitch Forman;<br>Reuben Rowlands, both of Runcorn,<br>England |
|---|---|---|
| [21] | Appl. No. | 591,963 |
| [22] | Filed | Nov. 4, 1966 |
| [45] | Patented | Sept. 21, 1971 |
| [73] | Assignee | Imperial Chemical Industries Limited<br>London, England |
| [32] | Priority | Nov. 18, 1965 |
| [33] | | Great Britain |
| [31] | | 49,079/65 |

[54] BROMINATION PROCESS
13 Claims, No Drawings

[52] U.S. Cl. ..................................................... 260/658 R,
260/660
[51] Int. Cl. ....................................................... C07c 17/10,
C07c 19/00
[50] Field of Search ........................................... 260/660,
650, 651, 658

[56] References Cited
UNITED STATES PATENTS

| 2,607,802 | 8/1952 | Britton et al. ................. | 260/544 R |
| 3,372,198 | 3/1968 | Cywinski ....................... | 260/642 |
| 3,413,359 | 11/1968 | Vives et al. .................... | 260/660 |
| 2,324,248 | 7/1943 | Vaughan et al. ............... | 260/660 |
| 2,324,249 | 7/1943 | Vaughan et al. ............... | 260/660 |
| 2,299,441 | 10/1942 | Vaughan et al. ............... | 260/660 |

FOREIGN PATENTS

| 1,392,045 | 2/1965 | Great Britain ................. | 260/658 |
| 1,151,811 | 7/1963 | Germany ....................... | 260/650 |

OTHER REFERENCES

Kharasch et al., V. Org. Chem. 6 810– 817 (1941)
Schulek et al., Chemical Abstracts 56, 2871ac(1962)
Nentwig, Chemical Abstracts 60, 456a(1964)
Groggins Unit Processes in Organic Chemistry 1958 Edition, Page 205
Mellor, Comprehensive Treatise on Inorganic and Theoretical Chemistry, 1922, 114– 116, Primary Examiner—Daniel D. Horwitz
Attorney—Cushman, Darby & Cushman ABSTRACT: Bromination of paraffinic hydrocarbons containing from 8 to 22 carbon atoms or chlorinated derivatives thereof using a mixture of liquid bromine and chlorine in the presence of a free radical catalyst.

BROMINATION PROCESS

This invention relates to an improved bromination process.

According to the present invention there is provided a process for the manufacture of bromo-hydrocarbons which comprises contacting a hydrocarbon or a partially substituted hydrocarbon with molecular bromine in the liquid phase in the presence of molecular chlorine and a catalyst giving rise to free radicals under reaction conditions.

The process is applicable to the bromination of a wide range of aliphatic and aromatic hydrocarbons. Suitable starting materials include paraffinic hydrocarbons, for example those containing from 4 to 30 carbon atoms; the process is especially applicable to the bromination of paraffinic hydrocarbons containing from 8 to 22 carbon atoms. The process is also applicable to the bromination of a wide range of partially substituted apliphatic and aromatic hydrocarbons; in particular partially halogenated derivatives may be used as starting materials, for example partially chlorinated paraffinic hydrocarbons containing from 8 to 22 carbon atoms.

The proportion of bromine in the reaction mixture may be varied over a wide range depending upon the starting material and upon the desired degree of bromination. In general, it is preferred to use from 1 to 10 moles of bromine per mole of hydrocarbon or partially substituted hydrocarbon.

The proportion of chlorine if preferably in the range from 1.0 to 1.5 moles of chlorine per mole of bromine. Some of the benefits of the present process may, however, be obtained when the proportion of chlorine is below this range. When the proportion of chlorine is increased above the said range, the bromination process may still be efficient but the extent of any simultaneous chlorination may become substantial, depending upon the starting material and upon the other reaction conditions employed.

The catalyst giving rise to free radicals under reaction conditions is preferably an azo compound in which the valencies of the azo group are attached to nonaromatic (preferably tertiary) carbon atoms, for example $\alpha,\alpha$azo-di-isobutyronitrile. Other catalysts which may be used include organic peroxides, for example benzoyl peroxide, and organic hydroperoxides. The proportion of the catalyst is preferably in the range from $10^{14}$ mole to $10^{12}$ mole per mole of the hydrocarbon or substituted hydrocarbon.

The bromination may conveniently be carried out by adding liquid bromine to a liquid hydrocarbon or partially substituted hydrocarbon containing the catalyst and passing gaseous chlorine through the reaction mixture; alternatively, or additionally, catalyst may be introduced in portions as the reaction proceeds. A liquid diluent may be used, preferably a diluent inert towards bromine, for example carbon tetrachloride.

The process may be operated over a wide range of temperature and pressure, depending partly upon the starting materials employed. The reaction temperature may be, for example, in the range from 15° C. to 100° C. It is especially preferred to maintain the temperature in the range 30° C. to 60° C. The process is conveniently operated at substantially atmospheric pressure but higher or lower pressures may be used; in particular superatmospheric pressures may be employed in order to retain lower-boiling starting materials in the liquid phase.

The present process provides a route to a wide range of brominated products the availability of which has hitherto been limited by the inconvenience and inefficiency of known processes.

The relatively small extent of chlorination which may occur simultaneously with the desired bromination may be tolerated in many applications of the brominated products, as for example when brominated paraffins are used as fire-retardant additives for plastic compositions or as intermediates in the manufacture of such additives.

The invention is illustrated but not limited by the following examples.

Example 1

0.218 gram of $\alpha,\alpha$azo-di-isobutyronitrile and 650 grams of bromine were added 218 grams of mixed n-paraffins containing from 14 to 17 carbons atoms in the molecule (average composition $C_{15.4}H_{32.8}$) in a glass vessel provided with a stirrer and a reflux condenser. Stirring was continued while gaseous chlorine was passed into the mixture at the rate of 80 liters per hour; the reaction mixture was cooled so that the temperature did not rise above 40° C. The flow of chlorine was continued for 1¾ hours. At the end of this period volatile components were removed from the product by purging with a stream of nitrogen (500 liters per hour) at 60—60° C. for 1½ hours.

The weight of the residual product, comprising brominated paraffins, was 645 grams.

Example 2

The procedure of example 1 was repeated except that benzoyl peroxide (0.218 gram) was used as catalyst and the weight of bromine added was 500 grams. The flow-rate of chlorine was 40 liters per hour.

The weight of the residual product, comprising brominated paraffins, was 353 grams.

Example 3

384 grams of chlorinated n-paraffins (average composition approximately $C_{15}H_{27}Cl_5$) were brominated by a method similar to that described in example 1. The catalyst used was $\alpha,\alpha$-azo-di-isobutyronitrile (0.384 gram) and the weight of bromine added was 100 grams; chlorine was passed into the mixture at the rate of 200 liters per hour for 22 minutes.

The weight of the residual brominated product was 452 grams.

Example 4

20 grams of bromine were added dropwise to 40 grams of 2-phenylhexane at 35° C. 0.04 gram of $\alpha$, $\alpha$azo-di-isobutyronitrile was then added together with a further 50 grams of bromine and chlorine was passed through the mixture at the rate of 25 liters per hour for 1 hour, while the temperature was maintained at 40°–50° C.

After purging with nitrogen, the weight of the residual brominated product was 86 grams.

Example 5

Bromine was added dropwise to 256 grams of molten naphthalene at 80°–90° C. while chlorine was passed through the mixture at the rate of 40 liters per hour. A vigorous reaction continued until 230 grams of bromine has been added, at which stage reaction subsided. 0.26 gram of $\alpha,\alpha$-azo-di-isobutyronitrile was then added and addition of bromine was continued while chlorine was passed at 80 liters per hour for 3 hours; the total weight of bromine added was 550 grams.

After purging with nitrogen, the weight of the residual brominated product was 809 grams.

Example 6

218 grams of mixed n-paraffins (average composition $C_{15.4}H_{32.8}$ were brominated by a method similar to that described in example 1 except that acetyl cyclohexanesulphonyl peroxide (0.9 gram) was used as the catalyst; the weight of bromine used was 500 grams and gaseous chlorine was passed into the mixture (maintained at 45° C.) at the rate of 40 liters per hour for a period of 2 hours.

After purging with nitrogen the weight of residual product was 396 grams; this product contained (by weight) 43.4% of bromine and 1.8% of chlorine.

Example 7

218 grams of mixed n-paraffins (average composition $C_{15.4}H_{32.8}$ were brominated by a method similar to that described in example 1 except that di-isopropylperoxy dicarbonate (0.9 gram) was used as the catalyst; the weight of bromine used was 500 grams and gaseous chlorine was passed into the mixture (maintained at 45° C.) at the rate of 40 liters per hour for a period of 2 hours.

After purging with nitrogen the weight of residual product was 435 grams; this product contained (by weight) 45.8% of bromine and 4.0% of chlorine.

Example 8

218 grams of mixed n-paraffins (average composition $C_{15.4}H_{32.8}$ was brominated by a method similar to that described in example 1; 0.9 gram of α,α-azo-di-isobutyronitrile was used as catalyst, the weight of bromine used was 500 grams and gaseous chlorine was passed into the mixture (maintained at 45° C.) at the rate of 40 liters per hour for a period of 2 hours.

After purging with nitrogen the weight of residual product was 414 grams; this product contained (by weight) 48.3% of bromine and 0.4% of chlorine.

We claim:

1. A process for the production of bromo-hydrocarbons which comprises contacting a paraffinic hydrocarbon of 8 to 22 carbon atoms or a partially chlorinated paraffinic hydrocarbon of 8 to 22 carbon atoms with molecular bromine in the liquid phase in the presence of molecular chlorine and a catalyst giving rise to free radicals under reaction conditions wherein the temperature is 15° C. to 100° C.

2. A process as claimed in claim 1 wherein the proportion of chlorine employed is from 1.0 to 1.5 moles of chlorine per mole of bromine.

3. A process as claimed in claim 1 wherein the catalyst is an azo compound in which the valencies of the azo group are attached to nonaromatic carbon atoms.

4. A process as claimed in claim 3 wherein the catalyst is α,α-azo-di-isobutyronitrile.

5. A process as claimed in claim 1 wherein the catalyst is an organic peroxide or hydroperoxide.

6. A process as claimed in claim 5 wherein the catalyst is benzoyl peroxide.

7. A process as claimed in claim 1 wherein the proportion of catalyst is from $10^{14}$ to $10^{12}$ mole per mole of hydrocarbon or partially substituted hydrocarbons.

8. A process as claimed in claim 1 wherein the temperature is in the range from 30° C. to 60° C.

9. A process for the production of bromohydrocarbons which comprises contacting a feed selected from a paraffinic hydrocarbon of 8 to 22 carbon atoms and a partially chlorinated paraffinic hydrocarbon of 8 to 22 carbon atoms with molecular bromine in the liquid phase in the presence of molecular chlorine and a catalyst giving rise to free radicals under the reaction conditions, the proportion of bromine being 1 to 10 moles per mole of feed wherein the temperature is 15° C. to 100° C.

10. The process of claim 1 where the catalyst is selected from the group consisting of an azo compound and an organic peroxide or hydroperoxide.

11. The process of claim 1 wherein the temperature is 30° to 60° C.

12. The process of claim 10 wherein the proportion of chlorine is 1 to 1.5 moles per mole of bromine.

13. A process for the production of bromo-hydrocarbons which comprises adding liquid bromine to a liquid paraffinic hydrocarbon or partially chlorinated liquid paraffinic hydrocarbon of 8 to 22 carbon atoms, which hydrocarbon contains a catalyst giving rise to free radicals under the reaction conditions, and passing gaseous molecular chlorine through the reaction mixture while maintaining a temperature in the reaction mixture of between 15° and 100° C.